(12) United States Patent
Nakamura

(10) Patent No.: US 11,016,334 B2
(45) Date of Patent: May 25, 2021

(54) DISPLAY DEVICE AND METHOD FOR MANUFACTURING SAME

(71) Applicant: Sharp Kabushiki Kaisha, Sakai (JP)

(72) Inventor: Jin Nakamura, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/834,216

(22) Filed: Mar. 30, 2020

(65) Prior Publication Data
US 2020/0326589 A1 Oct. 15, 2020

Related U.S. Application Data

(60) Provisional application No. 62/832,940, filed on Apr. 12, 2019.

(51) Int. Cl.
G02F 1/1335 (2006.01)
G02F 1/1333 (2006.01)

(52) U.S. Cl.
CPC ...... *G02F 1/133528* (2013.01); *G02F 1/1333* (2013.01)

(58) Field of Classification Search
CPC ............. G02F 1/1335; G02F 1/133528; G02F 1/1333; G02F 1/133504; G02F 1/1336; G02F 1/133602; G02F 1/133611; G02F 1/133615; H04M 1/0266; G09F 9/00
See application file for complete search history.

(56) References Cited

U.S. PATENT DOCUMENTS

2020/0292871 A1* 9/2020 Inoue ................. G02F 1/133528

FOREIGN PATENT DOCUMENTS

JP 2018-012182 A 1/2018

* cited by examiner

*Primary Examiner* — Thoi V Duong
(74) *Attorney, Agent, or Firm* — Keating & Bennett, LLP

(57) ABSTRACT

A display device includes a display panel including an opening through which no display light is emitted, and a polarizer provided on a back face side of the display panel, the polarizer including an opening at a position overlapping the opening, and a light source, in which at least a side face at the opening is inclined at an acute angle with respect to the display panel.

3 Claims, 7 Drawing Sheets

36

3

36

3

36

3

DISPLAY DEVICE AND METHOD FOR MANUFACTURING SAME

CROSS-REFERENCE TO RELATED APPLICATION

The present application claims priority from Provisional Application No. 62/832,940 filed on Apr. 12, 2019, the content to which is hereby incorporated by reference into this application.

BACKGROUND OF THE INVENTION

1. Field of the Invention

The present disclosure relates to a display device and to a method for manufacturing the display device.

2. Description of the Related Art

JP 2018-12182A (published on Jan. 25, 2018) discloses a method for manufacturing a deformed polarizer including a recessed R portion or a hole portion. JP 2018-12182A (published on Jan. 25, 2018) also describes that the method for manufacturing the deformed polarizer suppresses an occurrence of crack or fracture or discoloration that arises in the deformed polarizer during processing, and an accumulation of shavings at the root portion of the blade of an end mill.

SUMMARY OF THE INVENTION

In recent years, there has been increased demand for a display panel having a deformed shape (circular shape, cutout, corner cut, and the like). One advantage of the display panel having a deformed shape is that the screen occupancy ratio with respect to a display device can be maintained even when a device such as a camera or the like is disposed on the display device.

On the other hand, in a case of a display panel having a deformed shape, light leakage from a light source such as a backlight is possibly confirmed from an oblique view through the deformed shape.

Then, an aspect of the present disclosure has been made in view of the above-mentioned issue, and has an object to achieve a display device in which light leakage through the deformed shape is suppressed.

(1) One embodiment of the present disclosure is a display device including a display panel including an opening through which no display light is emitted; a polarizer provided on a back face side of the display panel, the polarizer including an opening at a position overlapping the opening of the display panel; and a light source configured to emit light, via the polarizer, to the display panel, in which at least a side face at the opening of the polarizer is inclined at an acute angle with respect to the display panel.

(2) Another embodiment of the present disclosure is a method for manufacturing the display device according to the above-described item (1), the method including a polarizer processing in which at least the side face at the opening of the polarizer is processed by an end mill or a mold to be inclined at an acute angle with respect to the display panel.

(3) Another embodiment of the present disclosure is a method for manufacturing a display device, in which in the polarizer processing, the side face of the polarizer is punched by the mold, from a face on an opposite side of a face facing the display panel, to be inclined, in addition to the configuration of the above-described item (2).

According to an aspect of the present disclosure, a display device in which a light leakage through a deformed shape is suppressed, can be achieved.

BRIEF DESCRIPTION OF DRAWINGS

FIG. 4A is a cross-sectional view of the polarizer 3 before the polarizer processing, FIG. 4B is a cross-sectional view of the polarizer 3 during the polarizer processing, and FIG. 4C is a cross-sectional view of the polarizer 3 after the polarizer processing.

FIG. 5A is a cross-sectional view of the polarizer 3 before the polarizer processing, FIG. 5B is a cross-sectional view of the polarizer 3 during the polarizer processing, and FIG. 5C is a cross-sectional view of the polarizer 3 after the polarizer processing.

FIG. 6A is a cross-sectional view of the polarizer 3 before the polarizer processing, FIG. 6B is a cross-sectional view of the polarizer 3 during the polarizer processing, and FIG. 6C is a cross-sectional view of the polarizer 3 after the polarizer processing. FIG. 6D is a plan view of the polarizer 3 after the polarizer processing.

DETAILED DESCRIPTION OF THE INVENTION

Figure 1A:
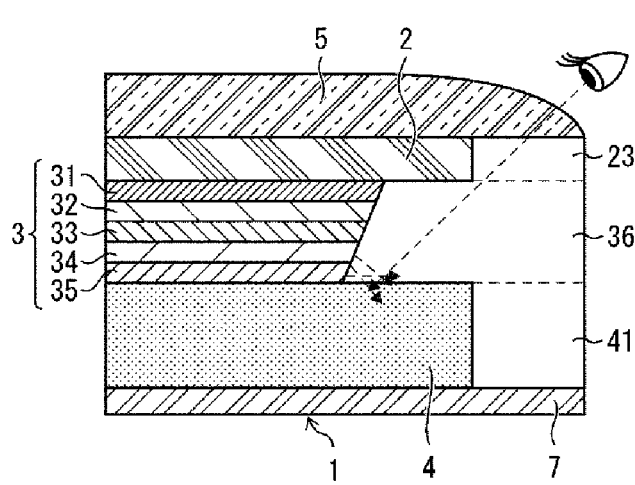
FIG. 1A is an enlarged cross-sectional view schematically illustrating a configuration of a display device 1 according to an embodiment of the present disclosure.
Figure 1B:
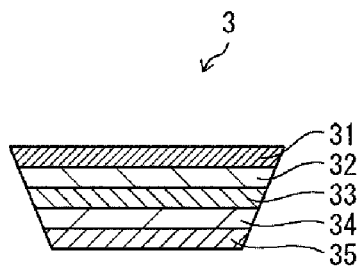
FIG. 1B is a cross-sectional view of a polarizer 3 in the display device 1 according to the embodiment of the present disclosure.
Figure 1C:
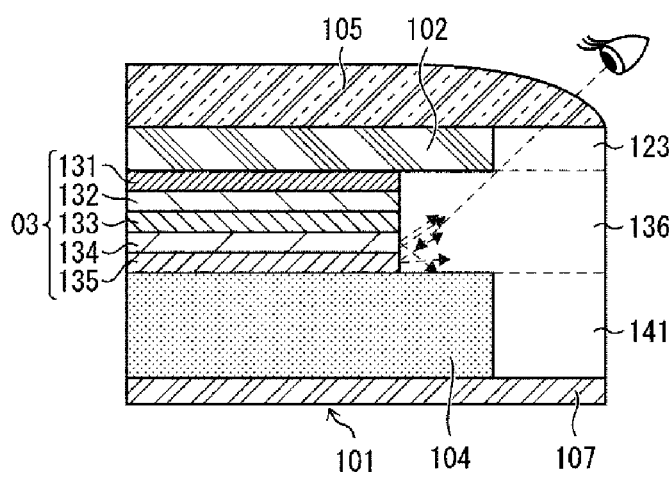
FIG. 1C is an enlarged cross-sectional view schematically illustrating a configuration of a display device 100 according to the prior art.
Figure 1D:
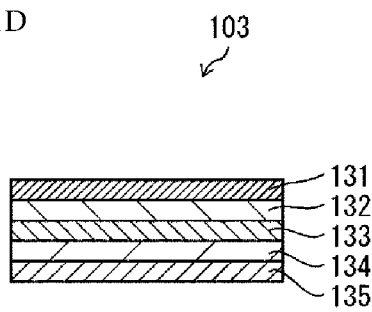
FIG. 1D is a cross-sectional view of the polarizer 3 in the display device 100 according to the prior art.
Figure 2A:
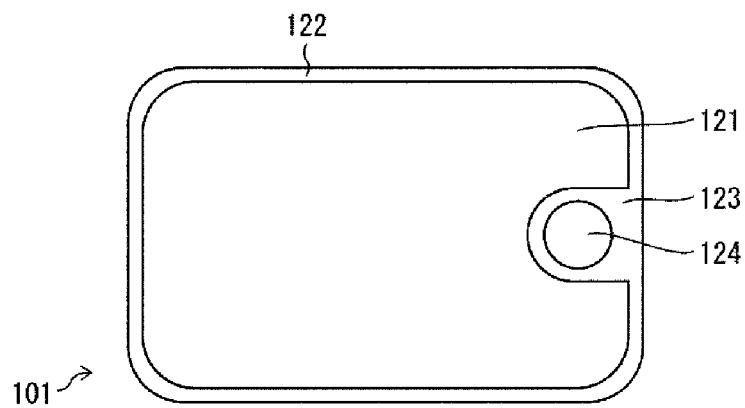
FIG. 2A is a plan view schematically illustrating a configuration of the display device 100 according to the prior art.
Figure 2B:
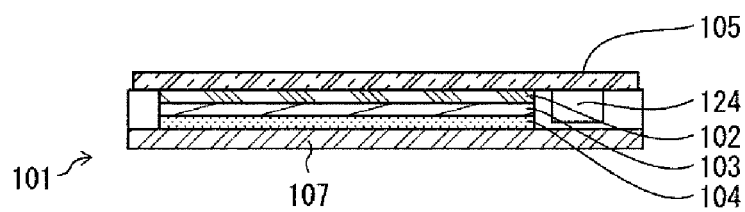
FIG. 2B is a cross-sectional view schematically illustrating a configuration of the display device 100 according to the prior art.
Figure 2C:
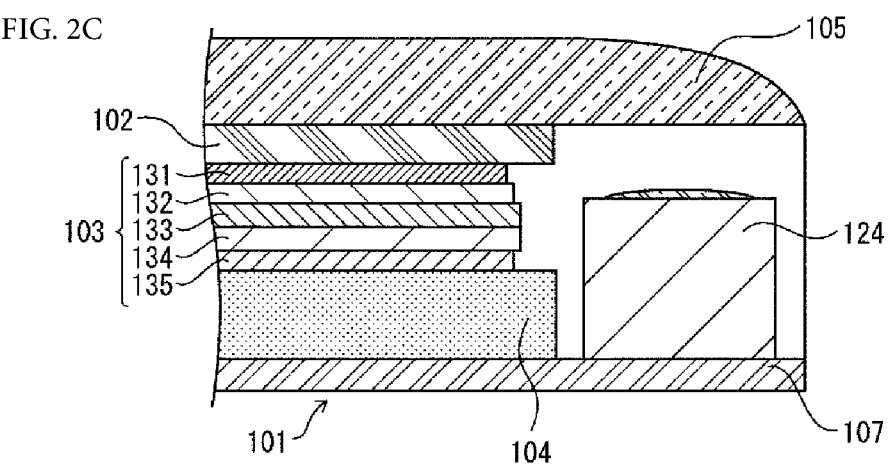
FIG. 2C is an enlarged cross-sectional view schematically illustrating a configuration of the display device 100 according to the prior art.
Figure 3A:
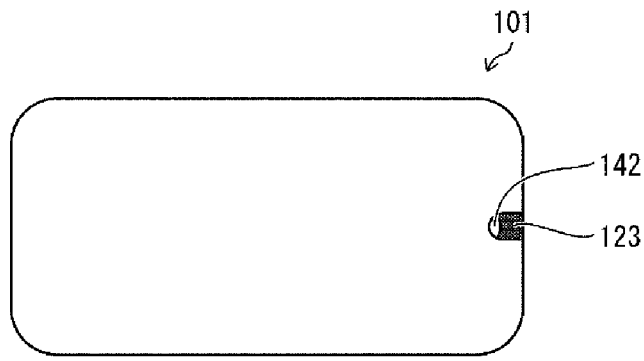
FIG. 3A is a plan view schematically illustrating a configuration of the display device 100 according to the prior art.
Figure 3B:
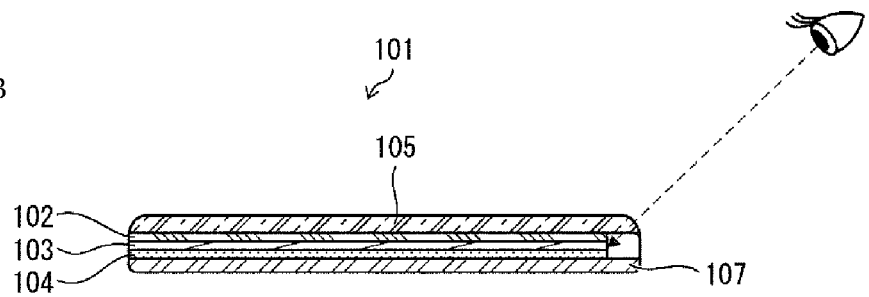
FIG. 3B is a cross-sectional view schematically illustrating a configuration of the display device 100 according to the prior art.
Figure 3C:
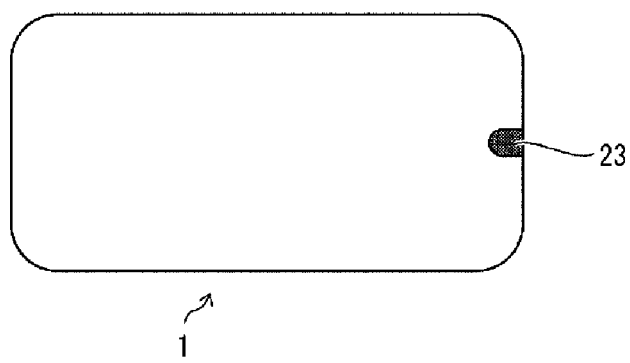
FIG. 3C is a plan view schematically illustrating a configuration of the display device 1 according to the embodiment of the present disclosure.

A display device 1 of an embodiment of the present disclosure will be described with reference to FIGS. 1A to 3C. FIG. 1A is an enlarged cross-sectional view schematically illustrating a configuration of the display device 1 according to the embodiment of the present disclosure. FIG. 1B is a cross-sectional view of a polarizer 3 in the display device 1 according to the embodiment of the present disclosure. FIG. 1C is an enlarged cross-sectional view schematically illustrating a configuration of a display device 100 according to the prior art. FIG. 1D is a cross-sectional view of the polarizer 3 in the display device 100 according to the prior art. FIG. 2A is a plan view schematically illustrating the configuration of the display device 100 according to the prior art. FIG. 2B is a cross-sectional view schematically illustrating the configuration of the display device 100 according to the prior art. FIG. 2C is an enlarged cross-sectional view schematically illustrating the configuration of the display device 100 according to the prior art. FIG. 3(a) is a plan view schematically illustrating the configuration of the display device 100 according to the prior art. FIG. 3B is a cross-sectional view schematically illustrating the configuration of the display device 100 according to the prior art. FIG. 3C is a plan view schematically illustrating the configuration of the display device 1 according to the embodiment of the present disclosure.

Display Device 1

As illustrated in FIG. 1A, the display device 1 includes a cover glass (CG) 5, which is a protection plate, a display panel 2, a polarizer 3, a light source 4, and a housing 7. In the display device 1, the light source 4, the polarizer 3, the display panel 2, and the CG 5 are arranged in this order toward the upward direction (the emission direction of a display light). Examples of the display device 1 include a smart phone, a tablet, and the like.

Display Panel 2

As illustrated in FIG. 1A and FIG. 3C, the display panel 2 includes an opening 23 through which no display light is emitted. Examples of the opening 23 include a see-through camera hole and the like. The planar shape of the opening 23 is a shape corresponding to the characteristics of a functional element, which is an imaging element such as a camera, for example. The planar shape design is desirable in consideration of the incident angle of light on the lens, in addition to lens properties such as lens geometry. In this specification, the opening may also be a cut-out portion as illustrated in FIG. 3C.

The functional element is not limited to an imaging element. The functional element may be a light-emitting element such as an LED light or a light-receiving element such as an optical sensor. The functional element may also have the functions of receiving light and emitting light. The imaging element may also be used for face authentication. A functional element FD may also be a fingerprint authentication element (including an optical sensor), and a capacitive touch sensor may be provided at a light transmissive portion TS.

Polarizer 3

As illustrated in FIG. 1A and FIG. 1B, the polarizer 3 is provided on the back face side of the display panel 2. The polarizer 3 includes an adhesive film 31, a phase difference film 32, a polarizing film 33, a light diffusion film 34, and a brightness enhancement film 35. In the polarizer 3, the brightness enhancement film 35, the light diffusion film 34, the polarizing film 33, the phase difference film 32, and the adhesive film 31 are arranged in this order toward the upward direction (the emission direction of the display light). The polarizer 3 may be provided on the front face side of the display panel 2.

As illustrated in FIG. 1A, the polarizer 3 includes an opening 36 at a position overlapping the opening 23 of the display panel 2. The opening 36 of the polarizer 3 may overlap in a plan view with the opening 23 of the display panel 2 at least at a part of the opening 36. The planar shape of the opening 36 has a shape corresponding to the characteristics of a functional element, which is an imaging element such as a camera, for example. The planar shape design is desirable in consideration of the incident angle of light on the lens, in addition to lens properties such as lens geometry.

Further, as illustrated in FIG. 1A, the side face at the opening 36 of the polarizer 3 is inclined at an acute angle with respect to the display panel 2. The entire side face of the polarizer 3 may be inclined at an acute angle with respect to the display panel 2.

Light Source 4

The light source 4 emits light into the display panel 2 via the polarizer 3. Examples of the light source 4 include a backlight. The light source 4 in FIG. 1A is a direct-type backlight, and an edge-light type backlight may be used as well. As illustrated in FIG. 1A, the light source 4 includes an opening 41 at a position overlapping the opening 23 of the display panel 2. The opening 41 of the light source 4 may overlap in a plan view with the opening 23 of the display panel 2 at least at a part of the opening 41. The planar shape of the opening 41 is a shape corresponding to the characteristics of a functional element, which is an imaging element such as a camera, for example. The planar shape design is desirable in consideration of the incident angle of light on the lens, in addition to lens properties such as lens geometry.

Comparison with Display Device 101 According to Prior Art

As illustrated in FIG. 2A and FIG. 2B, a display device 101 according to the prior art includes a camera 124 at an opening 123 of a display panel 102 (a display region 121). Further, as illustrated in FIG. 1C and FIG. 1D, FIG. 2B and FIG. 2C, and FIG. 3B, in the display device 101, the side face at an opening 136 of a polarizer 103 is substantially perpendicular to the display panel 102.

After light emitted through a light source 104 passes through the polarizer 103, a part of the light is emitted through the side face of the polarizer 103. For example, the part of the light is easily emitted through a light diffusion film 134 and a brightness enhancement film 135 that constitute the polarizer 103. In order to arrange other devices such as a camera on the display device 101, an opening is provided through the liquid crystal module (the display panel 102, the polarizer 103, and the light source 104). In this case, light emitted through the side face at the opening 136 of the polarizer 103 may leak out through the opening 123 of the display panel 102 to the user side. That is, as illustrated in FIG. 3A, in a case of the display device 101, there is a possibility that leakage light 142 may be visually recognized.

On the other hand, as illustrated in FIG. 1A, in the display device 1 according to the embodiment of the present disclosure, the light diffusion film 34 and the brightness enhancement film 35 constituting the polarizer 3 are arranged farther from the opening 23 of the display panel 2 than the upper face of the polarizer 3 (the face facing the display panel 2). This configuration allows the reflection direction of light emitted through the side face at the opening 36 of the polarizer 3 to be converged into the lower portion of the polarizer 3, making the user difficult to visually recognize leakage light, as illustrated in FIG. 3C.

Method for Manufacturing Display Device 1
Method for Manufacturing Display Device 1 Using End Mill A method for manufacturing, using an end mill, the display device 1 according to an embodiment of the present disclosure will be described on the basis of FIGS. 4A-4C. Note that, for the convenience of description, members having the same functions as the members described in the foregoing embodiment will be given the same reference signs, and descriptions thereof will not be reiterated.

The method for manufacturing the display device 1 includes polarizer processing in which a processing is performed, using an end mill 8, so that at least the side face at the opening 36 of the polarizer 3 is inclined at an acute angle with respect to the display panel 2.

Figure 4A:
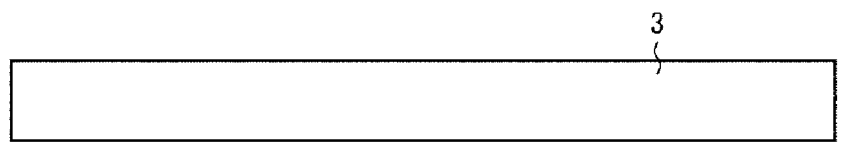
FIGS. 4A-4C are views illustrating a polarizer processing in a method for manufacturing the display device 1 according to the embodiment of the present disclosure.
Figure 4B:
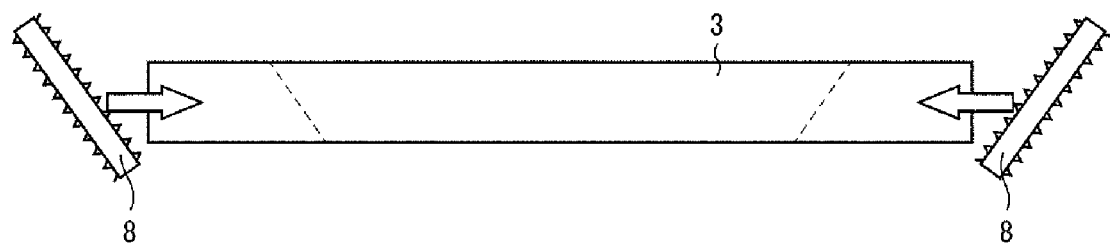
Figure 4C:
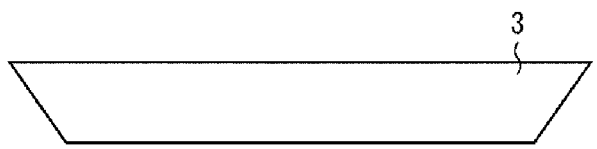

FIGS. 4A-4C are views illustrating the polarizer processing in the method for manufacturing the display device 1 according to the embodiment of the present disclosure. FIG. 4A is a cross-sectional view of the polarizer 3 before the polarizer processing, FIG. 4B is a cross-sectional view of the polarizer 3 during the polarizer processing, and FIG. 4C is a cross-sectional view of the polarizer 3 after the polarizer processing. The upper face of the polarizer 3 in each of the figures is provided on the back face side of the display panel 2. That is, the upper face of the polarizer 3 faces the display panel 2.

As illustrated in FIG. 4B, the side face of the polarizer 3 is obliquely cut by the end mill 8 to perform processing so that the side face of the polarizer 3 is inclined at an acute angle with respect to the display panel 2. The entire side face of the polarizer 3 may be processed, or only the side face at the opening 36 of the polarizer 3 may be processed. The end mill used can be a commercially available end mill. Alternatively, for example, the polarizer processing may be performed using equipment for manufacturing a polarizer, which is disclosed in PTL 1.

In the method for manufacturing the display device 1, the polarizer processing may further include film bonding in which films constituting the polarizer 3 (i.e., the adhesive film 31, the phase difference film 32, the polarizing film 33, the light diffusion film 34, and the brightness enhancement film 35) are bonded to one another. Then, the polarizer 3 after the film bonding may be processed by the end mill 8 to process the side face at the opening 36 of the polarizer 3 so that the side face is inclined at an acute angle with respect to the display panel 2. Processing the side face at the opening 36 of the polarizer 3 after the film bonding make it possible to process the side faces of the films constituting the polarizer 3 at one time.

Method for Manufacturing Display Device 1 Using Mold

A method for manufacturing, using a mold, the display device 1 according to an embodiment of the present disclosure will be described on the basis of FIGS. 5A-5C. Note that, for the convenience of description, members having the same functions as the members described in the foregoing embodiment will be given the same reference signs, and descriptions thereof will not be reiterated.

The method for manufacturing the display device 1 includes polarizer processing in which a processing is performed using a mold 9 so that the side face of the polarizer 3 is inclined at an acute angle with respect to the display panel 2.

Figure 5A:
FIGS. 5A-5C are views illustrating the polarizer processing in the method for manufacturing the display device 1 according to the embodiment of the present disclosure.
Figure 5B:
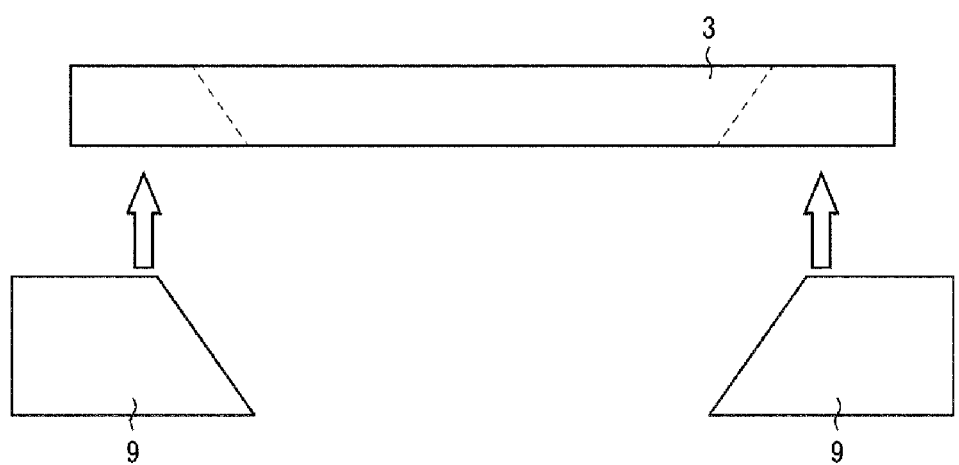
Figure 5C:

FIGS. 5A-5C are views illustrating the polarizer processing in the method for manufacturing the display device 1 according to the embodiment of the present disclosure. FIG. 5A is a cross-sectional view of the polarizer 3 before the polarizer processing, FIG. 5B is a cross-sectional view of the polarizer 3 during the polarizer processing, and FIG. 5C is a cross-sectional view of the polarizer 3 after the polarizer processing. The upper face of the polarizer 3 in each of the figures is provided on the back face side of the display panel 2. That is, the upper face of the polarizer 3 faces the display panel 2.

As illustrated in FIG. 5B, the side face of the polarizer 3 is obliquely cut by the mold 9 to perform processing so that the side face of the polarizer 3 is inclined at an acute angle with respect to the display panel 2. The entire side face of the polarizer 3 may be processed, or only the side face at the opening 36 of the polarizer 3 may be processed.

Further, as illustrated in FIG. 5B, punching is performed by the mold 9 from the lower face of the polarizer 3, which is a face on the opposite side of the face facing the display panel. The punching by the mold can be performed using a commercially available mold device (punching device). Performing punching from the lower face of the polarizer 3 makes it possible to obtain a desired shape of a polarizer.

Modified Example of Method for Manufacturing Display Device 1 Using Mold

In the above description, a description is given about the configuration of the polarizer processing in which a processing is performed by the mold 9, so that the side face of the polarizer 3 is inclined at an acute angle with respect to the display panel 2; however, the method for manufacturing the display device 1 is not limited to this configuration. FIG. 6 is a view illustrating polarizer processing in a modified example of method for manufacturing the display device 1.

Figure 6A:
FIGS. 6A-6D are views illustrating the polarizer processing in the method for manufacturing the display device 1, which is a modified example of the embodiment of the present disclosure.
Figure 6B:
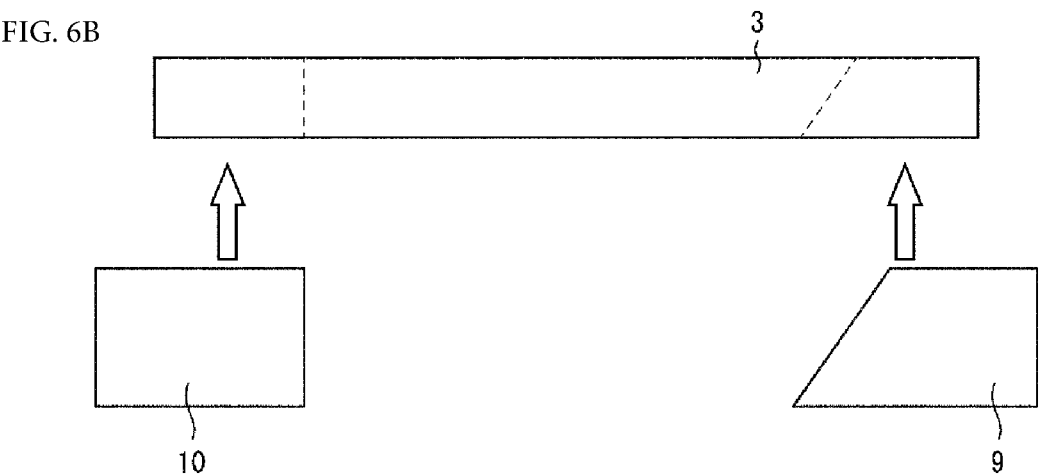
Figure 6C:
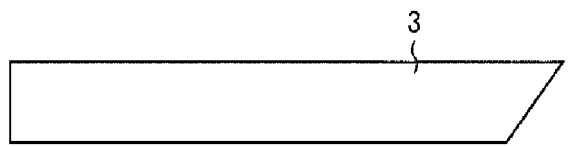
Figure 6D:
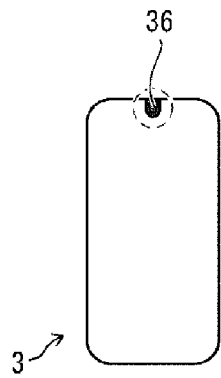

FIG. 6A is a cross-sectional view of the polarizer 3 before the polarizer processing, FIG. 6B is a cross-sectional view of the polarizer 3 during the polarizer processing, and FIG. 6C is a cross-sectional view of the polarizer 3 after the polarizer processing. The upper face of the polarizer 3 in each of the figures is provided on the back face side of the display panel 2. That is, the upper face of the polarizer 3 faces the display panel 2.

As illustrated in FIG. 6B, a part of the side face of the polarizer 3 is obliquely cut by the mold 9 to perform processing so that the side face of the polarizer 3 is inclined at an acute angle with respect to the display panel 2. For example, only the side face of the opening 36 may be obliquely cut by the mold 9. Obliquely processing only the side face of the openings 36 has an advantage in that the processing cost is suppressed.

Figure 7A:
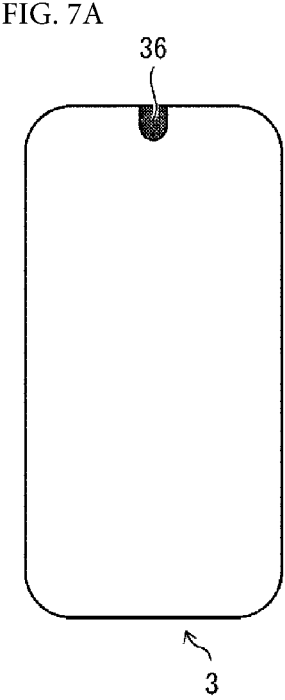
FIGS. 7A-7C are external views illustrating an example of an external view of the polarizer 3 after the polarizer processing in the method for manufacturing the display device 1, which is a modified example of the embodiment of the present disclosure.
Figure 7B:
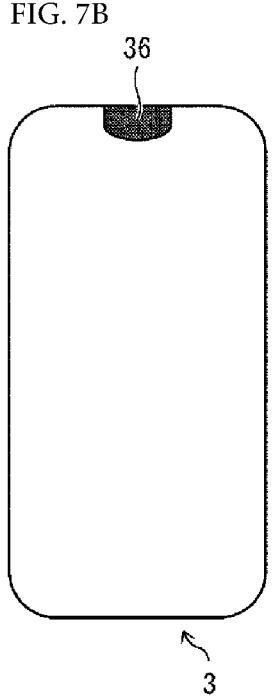
Figure 7C:
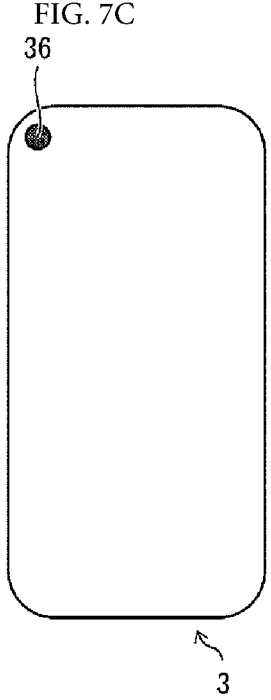

FIGS. 7A-7C are external views illustrating an example of the external view of the polarizer 3 obtained at the polarizer processing in the manufacturing method illustrated in FIGS. 6A-6D. The openings 36 in FIG. 7A and FIG. 7B have a notch shape. In FIG. 7C, the opening is formed at the inner side of the polarizer 3, and the planar shape of the opening is a circular shape. The shape, position, area, and number of the openings 23, 36, and 41 are not particularly limited, and can be appropriately selected.

What is claimed is:

1. A display device comprising:
    a display panel including an opening through which no display light is emitted;
    a polarizer provided on a back face side of the display panel, the polarizer including an opening at a position overlapping the opening of the display panel; and
    a light source configured to emit light, via the polarizer, to the display panel,
    wherein at least a side face of the polarizer facing the opening of the polarizer is inclined at an acute angle with respect to a surface of the display panel.

2. A method for manufacturing the display device according to claim 1, comprising a polarizer processing in which at least the side face of the polarizer facing the opening of the polarizer is processed by an end mill or a mold to be inclined at the acute angle with respect to the surface of the display panel.

3. The method for manufacturing the display device according to claim 2,
wherein in the polarizer processing, the side face of the polarizer is punched by the mold, from a face on an opposite side of a face facing the display panel, to be inclined.

\* \* \* \* \*